(12) United States Patent
Kim (10) Patent No.: US 7,001,542 B2
(45) Date of Patent: Feb. 21, 2006

(54) COLORED CONTACT LENS AND METHOD FOR MANUFACTURING THE SAME

(75) Inventor: Ssang-gi Kim, Daegu metropolitan (KR)

(73) Assignee: MI Gwang Contact Lens Co., Ltd., Kyungsan (KR)

( * ) Notice: Subject to any disclaimer, the term of this patent is extended or adjusted under 35 U.S.C. 154(b) by 0 days.

(21) Appl. No.: 10/706,223

(22) Filed: Nov. 12, 2003

(65) Prior Publication Data

US 2004/0095552 A1     May 20, 2004

Related U.S. Application Data

(62) Division of application No. 10/161,457, filed on May 31, 2002, now abandoned.

(51) Int. Cl.
*B29D 11/00*     (2006.01)

(52) U.S. Cl. .................. 264/1.7; 264/2.7; 264/132

(58) Field of Classification Search .............. 264/1.1, 264/1.7, 2.7, 132, 138; 425/808
See application file for complete search history.

(56) References Cited

U.S. PATENT DOCUMENTS

| 4,710,327 | A | | 12/1987 | Neefe |
|---|---|---|---|---|
| 4,710,328 | A | | 12/1987 | Neefe |
| 5,246,634 | A | | 9/1993 | Ichikawa et al. |
| 5,414,477 | A | | 5/1995 | Jahnke |
| 5,793,466 | A | | 8/1998 | Moncada |
| 5,863,363 | A | * | 1/1999 | Sankey .................. 156/61 |
| 5,936,705 | A | | 8/1999 | Ocampo et al. |
| 6,315,410 | B1 | * | 11/2001 | Doshi .................. 351/162 |
| 6,488,375 | B1 | | 12/2002 | Streibig |
| 2002/0167640 | A1 | | 11/2002 | Francis et al. |

* cited by examiner

*Primary Examiner*—Mathieu D. Vargot
(74) *Attorney, Agent, or Firm*—McDermott Will & Emery LLP (57) ABSTRACT

Disclosed are a colored contact lens and a method for manufacturing thereof, which forms a lens body by supplying a lens material onto a lower mold, molding a lens body with an upper mold and forms a cut portion and an optical portion by cutting off an upper surface of the lens body, and then forms a lens cover by forming an iris-colored part through printing on the cut portion and then supplying the lens material again onto the lens body, thus enabling mass production of the colored contact lens which does not cause any discomfort.

9 Claims, 9 Drawing Sheets

COLORED CONTACT LENS AND METHOD FOR MANUFACTURING THE SAME

CROSS-REFERENCE TO RELATED APPLICATION

This application is a divisional application of U.S. Ser. No. 10/161,457, filed May 31, 2002. The aforementioned patent application is incorporated herein by reference.

BACKGROUND OF THE INVENTION

1. Field of the Invention

The present invention relates to the field of a contact lens and, more particularly, to a colored contact lens having iris-colored part onto the lens core, and a method for manufacturing thereof.

2. Description of the Relevant Art

Generally, many people desire to have beautiful eyes and more recently people desire more beautiful and natural eye colors. Every race has its peculiar iris color, which makes each face look different. Some people want to possess a unique eye color which is different from their natural eye color. However, cosmetics or other accessories are not satisfactory to them.

To satisfy this desire, there is provided a colored contact lens, which is made by coloring the portion of a contact lens which covers the iris. This colored contact lens may serve two purposes; improving eyesight and enhancing appearance at the same time.

Until now, many kinds of colored contact lenses have been developed and used by many manufacturers all over the world.

Figure 1:
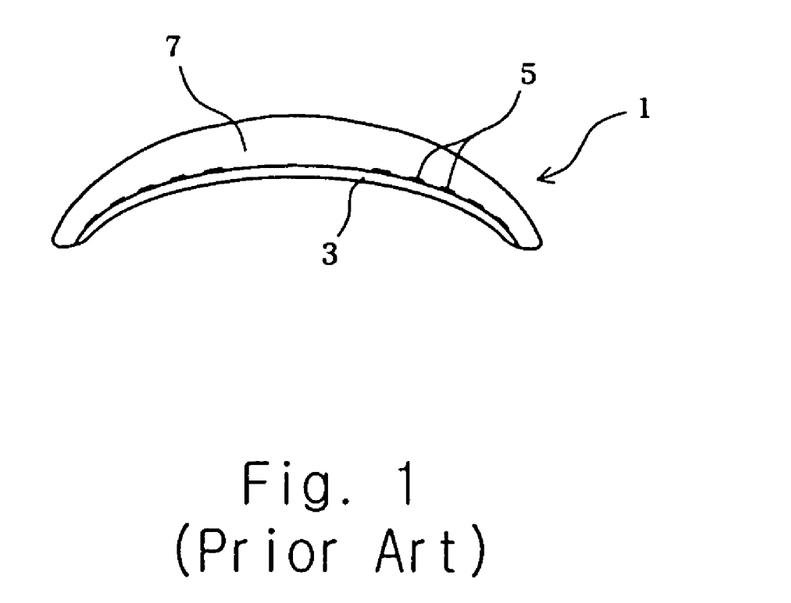
FIG. 1 is a sectional view showing an example of a colored contact lens according to the prior art.

At first, as shown in FIG. 1, an opaque colored soft contact lens is developed from Titomus Eurocon Co. in Germany. To make this lens, the technique provides a lower lens 3 by polymerizing HEMA (2-Hydroxyethylmethacrylate) and then forms an iris-colored part 5 by individually and manually painting a desired iris color with an opaque dye or pigment on the lower lens 3.

Then, a transparent upper contact lens 7 made of HEMA is bonded to the lower lens 3 having the iris-colored part 5 to make the colored contact lens 1.

However, since the iris-colored part 5 is painted on the lower lens 3 by hand, a pair of lenses may have different colors due to a lack of reproduction. Additionally, since two lenses are put together, they are thicker, and thus uncomfortable to wear.

Figure 2:
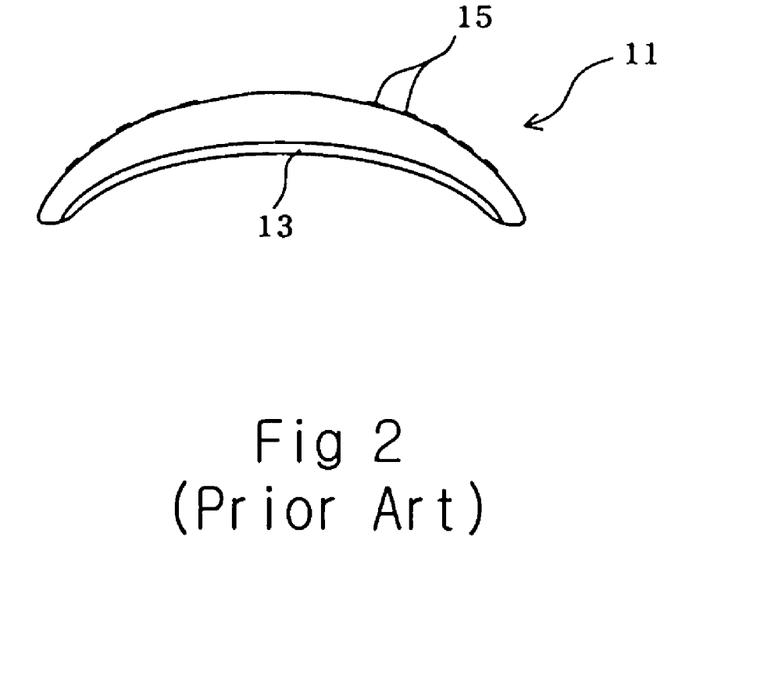
FIG. 2 is a sectional view showing another example of a colored contact lens according to the prior art.

There is also proposed a coloring technique for an opaque colored soft contact lens from Wesley Jackson Co. in U.S. As shown in FIG. 2, this technique suggests a method of polymerizing HEMA to form a lens 13 and then forming a iris-colored part by drawing lines with innumerable dots on, the lens 13, thus making a colored contact lens 11.

In this technique, the iris-colored part 15 is directly formed on a surface of the lens. 13. Though attractive, such a configuration may cause friction between the inner side of an eyelid and the iris-colored part of the contact lens. Thus, this kind of conventional lens cannot be used for a long period of time because of the possibility of conjunctivitis or absorption of waste matter, such as proteins or lipids, around the iris-colored part.

Figure 3:
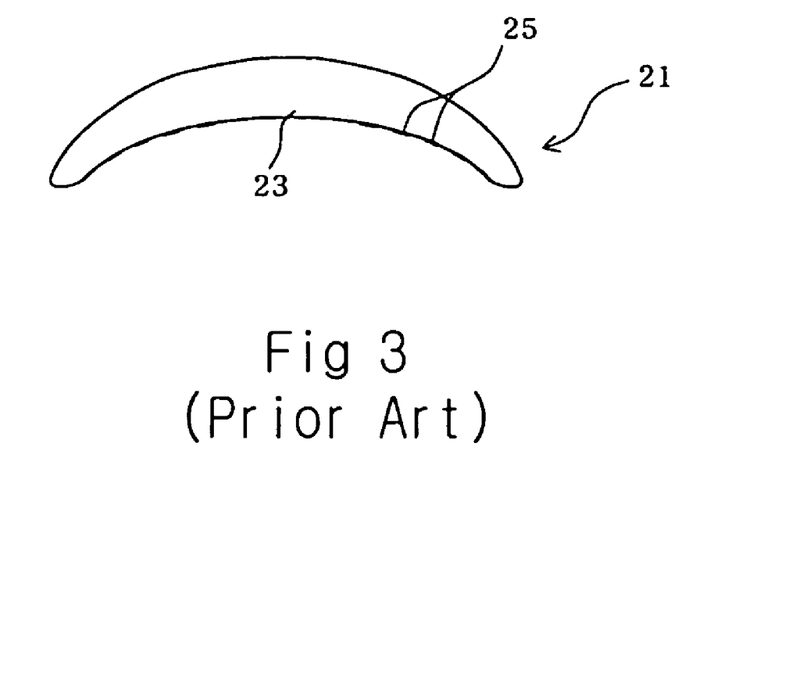
FIG. 3 is a sectional view showing still another example of a colored contact lens according to the prior art.

There is also developed a colored soft lens technique by Sereko Co. in England as shown in FIG. 3. This technique first provides a mold, and then forms a lens 23 onto the mold, in which HEMA monomer is polymerized and forms a lens having an iris-colored part 25 where opaque dyes mixed with HEMA monomer are printed, and then cut the lens 23 to make a colored soft lens 21.

Although this method makes mass production possible since the mold is used to make the lens 23, this technique has a problem in that it causes discomfort to the wearer of the contact lens and even causes keratitis as the iris-colored part on the lower side of the lens rubs a cornea when blinking.

SUMMARY OF THE INVENTION

The present invention is designed to overcome the above-mentioned problems of the colored contact lens, and an object of the present invention is to provide a colored contact lens which is comfortable and looks natural when wearing. Another object of the present invention is to provide a colored contact lens and a method for manufacturing thereof, which enables mass production with a lower cost.

In order to accomplish the above object, the present invention provides a colored contact lens comprising: a lens body having a cut portion and an optical portion, the cut portion formed by cutting off an upper surface of the lens body and the optical portion being upwardly protruded; an iris-colored part formed on the cut portion; and a lens cover formed by supplying a monomer and polymerizing on the upper surface of the lens body, whereby the iris-colored part is positioned on a lens core.

In another aspect of the present invention, there is provided a method for manufacturing a colored contact lens, the method comprising the steps of: providing a lens body by supplying the first lens material onto a lower mold and molding the first lens material with an upper mold; forming an optical portion and a cut portion by cutting off an upper surface of the lens body, the optical portion being upwardly protruded; forming an iris-colored part having an iris shape with a color on the cut portion; and forming a lens cover by supplying the second lens material onto the lens body and polymerizing the second lens material with a surface of the lens body.

The method may further comprise the step of cutting off an upper surface of the lens cover after forming the lens cover.

Preferably, the lower and upper molds are made of a material selected from the group consisting of polycarbonate, polybutyleneterephthalate and a mixture thereof.

The method may also further comprise the step of printing a transparent color on a surface of the optical portion.

Preferably, the iris-colored part is formed by multiple printing in dot pattern.

In addition, the first and second lens materials are preferably selected from the group consisting of HEMA (2-Hydroxyethylmethacrylate), HEMA+NVP (N-Vinyl-2-Pyrrolidone) and a mixture thereof.

Furthermore, the iris-colored part is preferably formed by a mixture of colorant, $TiO_2$, and at least one of HEMA and HEMA+NVP.

In still another aspect of the present invention, there is also provided a method of manufacturing a colored contact lens, the method comprising the steps of: providing a lens body by supplying a lens material onto a lower mold and molding the lens material with an upper mold; forming a cut portion by cutting off an upper surface of the lens body; forming an iris-colored part having an iris shape with a color on the cut portion; and supplying the lens material onto a surface of the lens body and polymerizing the lens material with the surface of the lens body.

BRIEF DESCRIPTION OF THE DRAWINGS

These and other features, aspects, and advantages of preferred embodiments of the present invention will be more fully described in the following detailed description, taken with the accompanying drawings. In the drawings.

DETAILED DESCRIPTION OF THE INVENTION

Hereinafter, preferred embodiments of the present invention will be described in detail with reference to the accompanying drawings.

Firstly, a colored contact lens according to the first embodiment includes a lens body 60 and a lens cover 80, wherebetween an iris-colored part 66 is formed at a position corresponding to the iris.

The lens body is formed by injecting and polymerizing monomer. The iris-colored part 66 can be printed with a predetermined color on the lens body 60. The lens cover 80 is formed on the lens body having the iris-colored part 66 by injection and polymerizing monomer which is identical to or different from that of the lens body 60.

The colored contact lens also includes a cut portion 62 and a optical portion (a), the cut portion 62 formed by cutting off an upper surface of the lens body 60 and the optical portion (a), where light enters, having a protrusion 64 upwardly protruded from the cut portion 62. The iris-colored part 66 is printed on the cut portion 62 except the optical portion.

According to the present invention, the lens cover 80 is polymerized on the lens body 60 after the iris-colored part 66 is printed on the cut portion 62, whereby the iris-colored part 66 is positioned not on a lens surface but on a lens core.

Figure 4A:
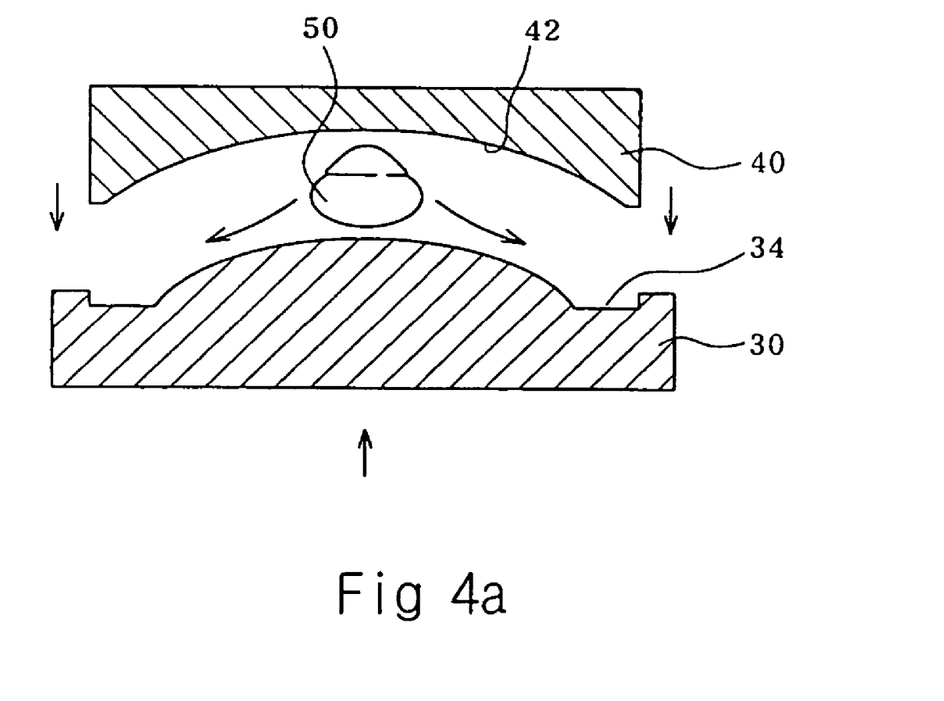
FIGS. 4a to 4g subsequently show a method of manufacturing a colored contact lens according to a first embodiment of the present invention.
Figure 4B:
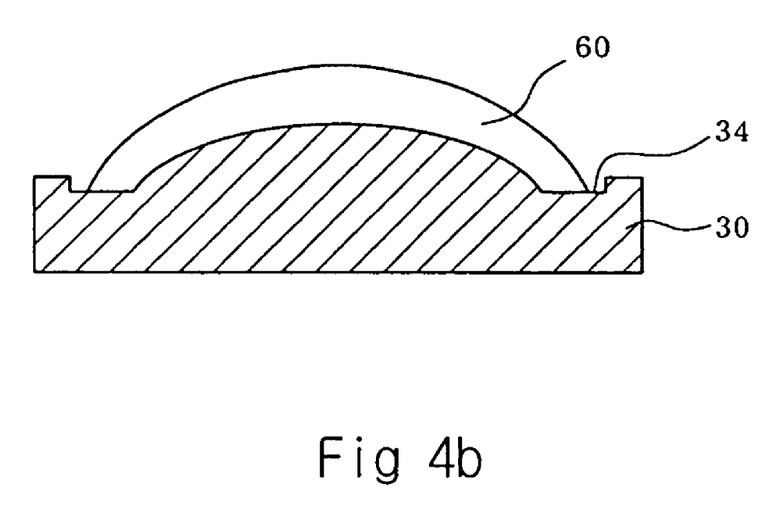

To make the colored contact lens according to the first embodiment, as shown in FIGS. 4a and 4b, a first lens material 50 is injected onto a lower mold 30 to shape a contact lens. The first lens material 50 is then pressed with a pressing surface 42 of an upper mold 40 to form the lens body 60.

The upper and lower molds 30, 40 can be made of polycarbonate or polybutyleneterephthalate.

Figure 4C:
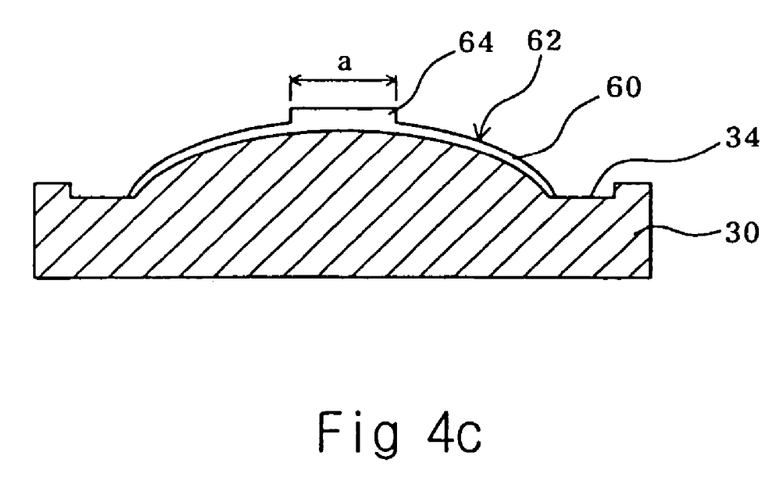

As shown in FIG. 4c, there is provided a protrusion 64 by forming the cut portion 62, which is made by cutting off the upper surface of the lens body except for the optical portion (a) on the lens body 60 so that the optical portion (a) is protruded to a certain height.

The optical portion (a) refers to the circular area corresponding to the pupil in the center of an iris. A transparent color can be printed upon the optical portion (a) of the protrusion 64.

Figure 4D:
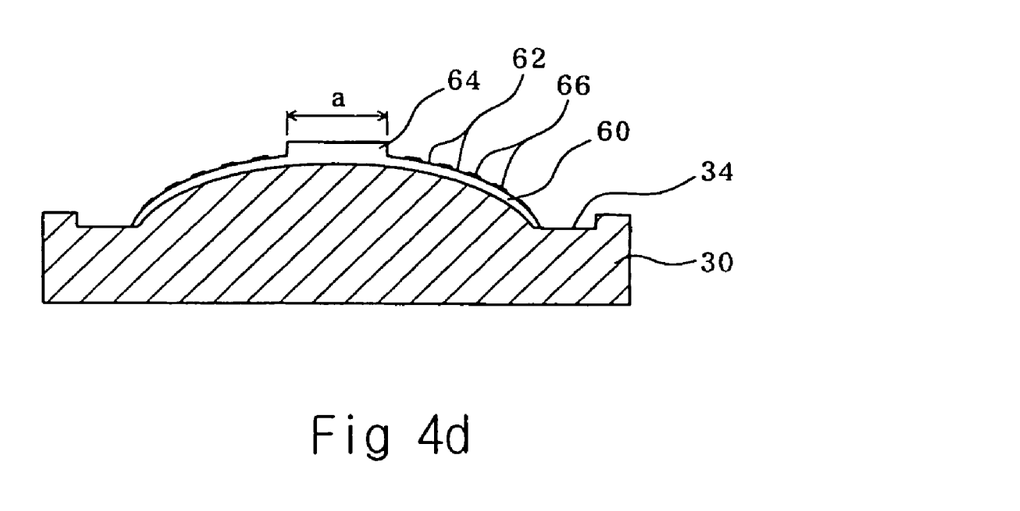

Then, as shown in FIG. 4d, an iris-colored part 66, having an iris shape, is formed on the cut portion 62 with a predetermined color.

At this time, several colors may be printed multiple times in an iris shape on the iris-colored part 66 so that the contact lens may have diverse, precise and clear colors.

In addition, the iris-colored part 66 may represent a line by connecting innumerable dots in a dot pattern.

The predetermined color for the iris-colored part 66 is preferably made of a mixture of colorant, $TiO_2$, and HEMA or HEMA+NVP.

Such an opaque pattern of the iris-colored part 66 may be changed as desired, and may have mono-color or multiple opaque colors. The colorant should preferably be one officially adopted by the FDA in America. The following colorants are available.

TABLE 1

| Colorant | C.I No | Cas No |
| --- | --- | --- |
| D&C Green No. 6: 21CFR 74.3206 | 61565 | 128-80-3 |
| D&C Yellow No. 10: 21CFR 74.37190 | 47005 | 8004-92-0 |
| [Phthalocyaninato(2-)]copper: 21CFR 74.3045 | 74160 | 147-14-8 |
| Carbazole violet: 21CFR 73.3107 | 51319 | 6358-30-1 |
| Sudan III: 21CFR 74.3230 | 26100 | 85-86-9 |

Figure 4E:
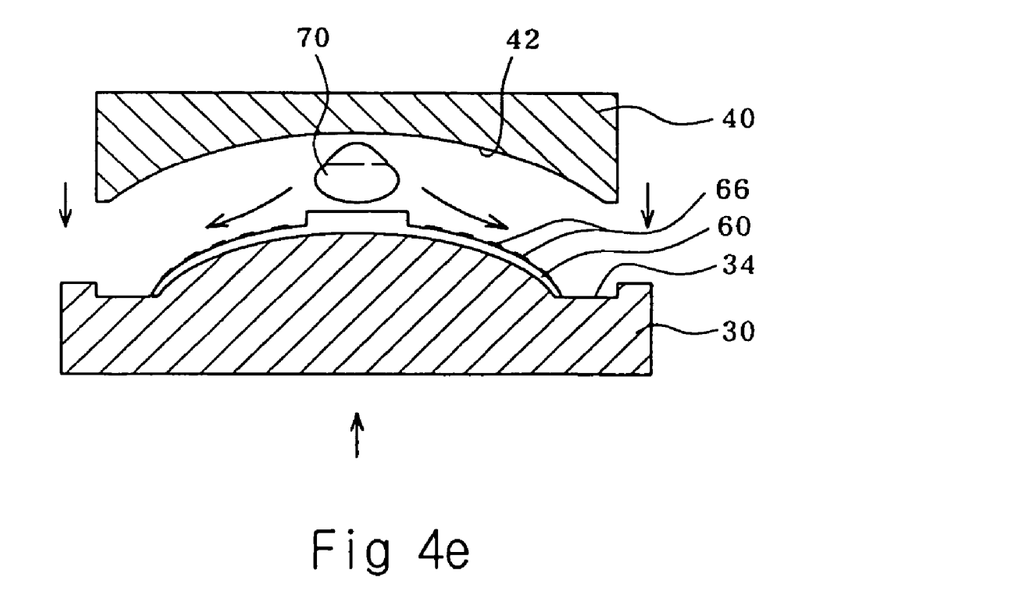
Figure 4F:
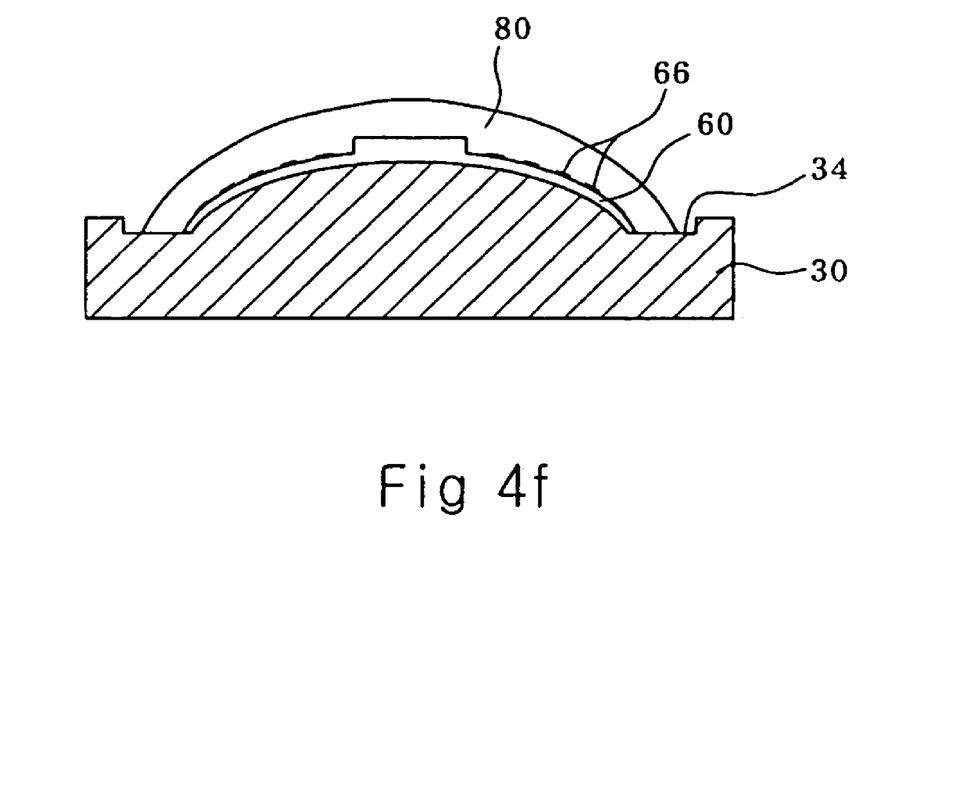

CFR: Code Of Federal Regulation
C.I. No: Color Index Number
CAS No: Chemical Abstracts Service Registry Number As is shown in FIGS. 4e and 4f, a second lens material 70 is supplied on the lens body 60, on which the iris-colored part 66 is formed. Pressing the second lens material 70 is then performed with the upper mold to form the lens cover 80.

The first and second lens materials 50, 70 are selected respectively from the group consisting of HEMA (2-Hydroxyethylmethacrylate), HEMA+NVP (N-Vinyl-2-Pyrrolidone) or their mixture.

Figure 4G:
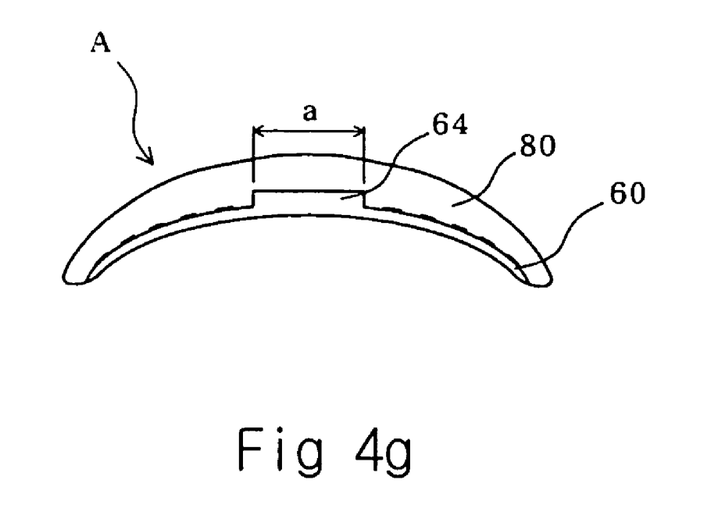

As shown in FIG. 4g, an upper surface of the lens cover 80 can then be cut to produce a smooth surface. As it is retrieved from the lower mold 30; the colored contact lens (A) of the present invention is completed.

Figure 5:
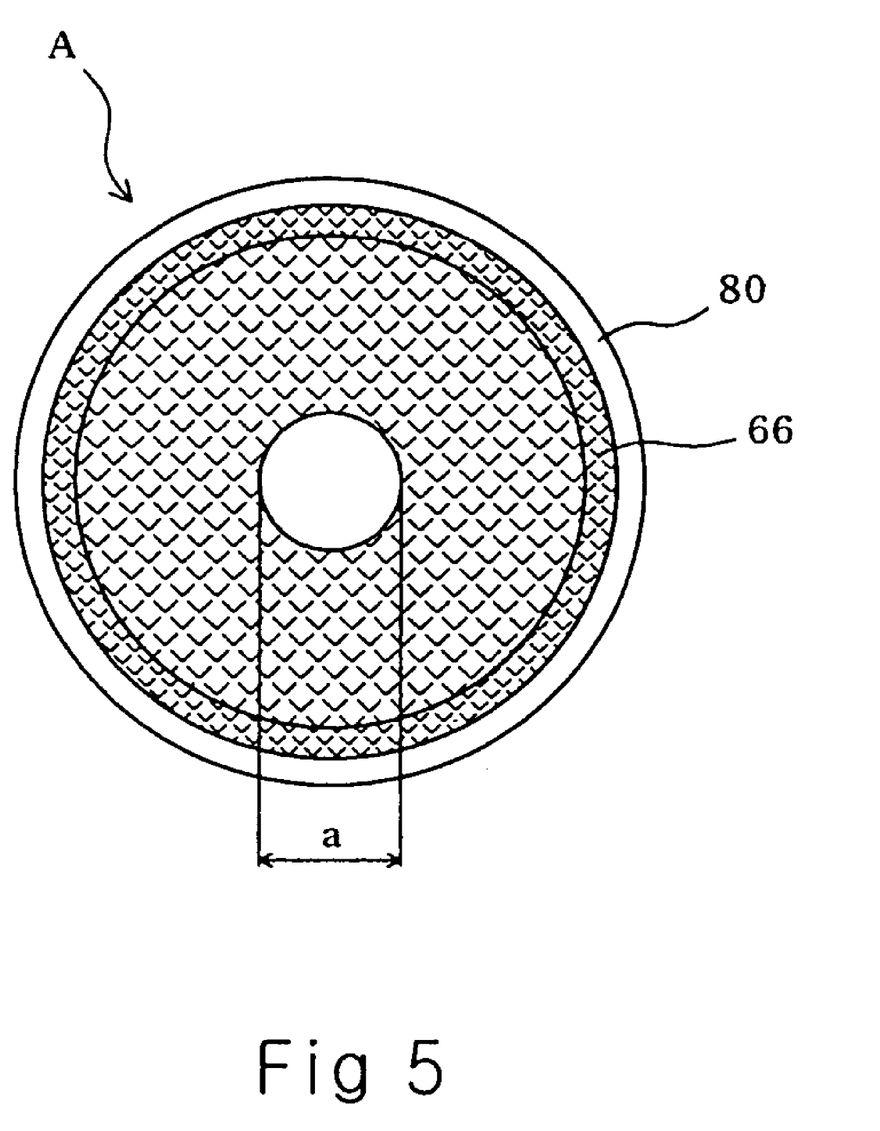
FIG. 5 shows the colored contact lens manufactured by the first embodiment of the present invention.

Referring to FIG. 5 showing the surface of the lens cover 80, it clearly shows the iris-colored part 66.

A method for manufacturing a colored contact lens according to the second embodiment of the present invention is described.

Figure 6A:
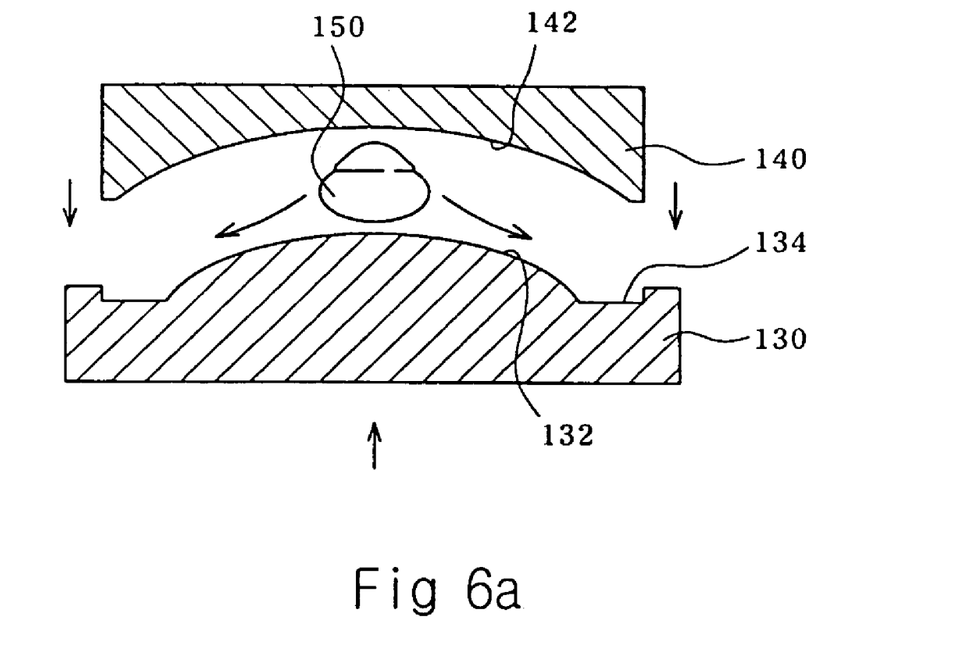
FIGS. 6a to 6f subsequently show a method of manufacturing a colored contact lens according to a second embodiment of the present invention.
Figure 6B:
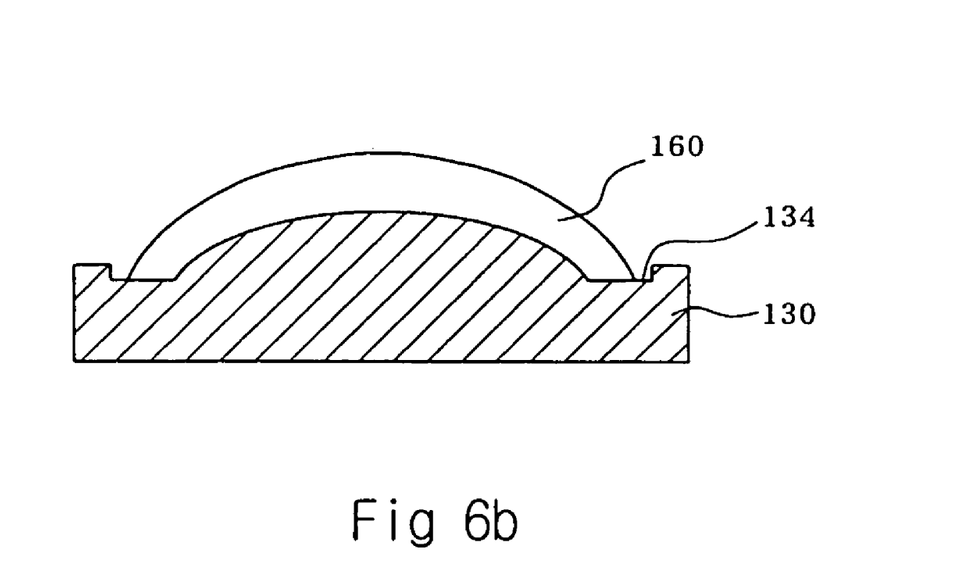

Referring to FIGS. 6a and 6b, a lens material 150 is injected onto a lower mold 130. The lens material 150 is then pressed with a pressing surface 142 of an upper mold 140 to form the lens body 160.

Figure 6C:
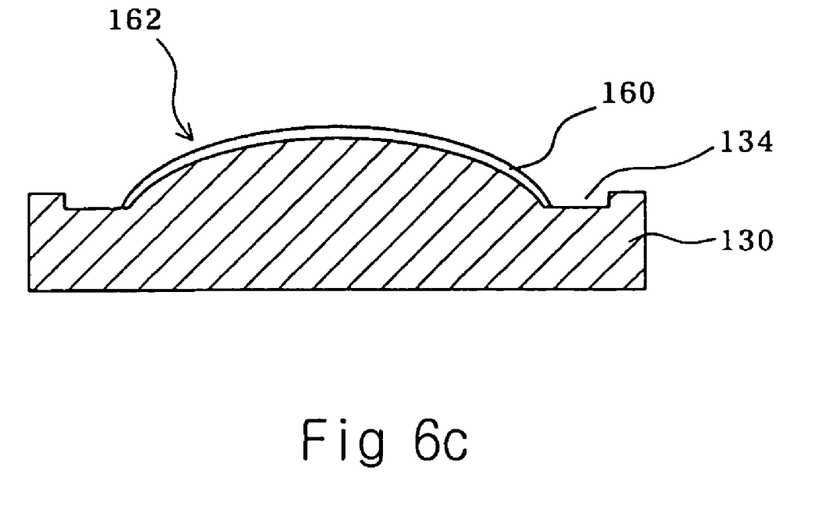

As shown in FIG. 6c, a cut portion 162 is formed by cutting off the upper surface of the lens body 160.

Figure 6D:
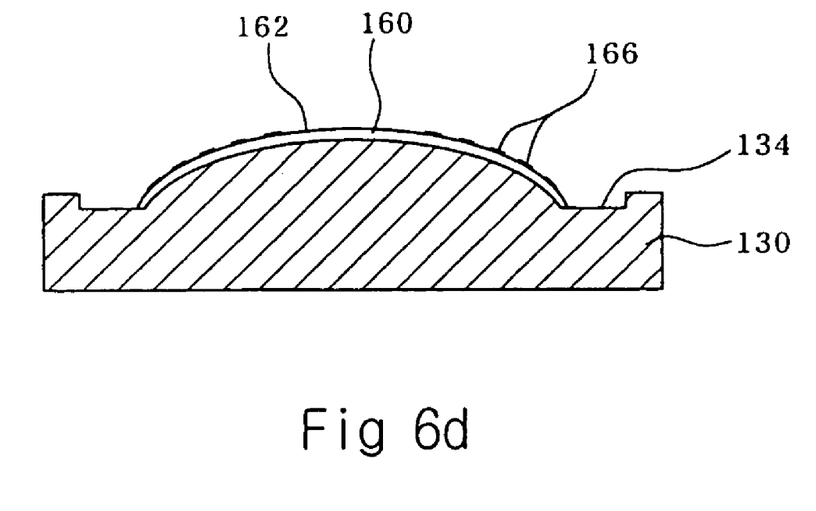

As shown in FIG. 6d, an iris-colored part 166 of an iris shape with a predetermined color is formed on the cut portion 162.

Figure 6E:
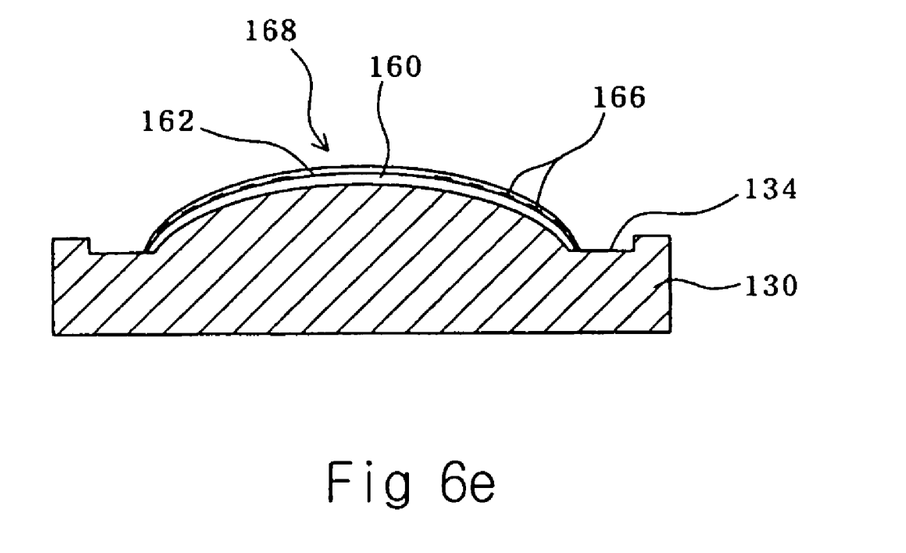
Figure 6F:
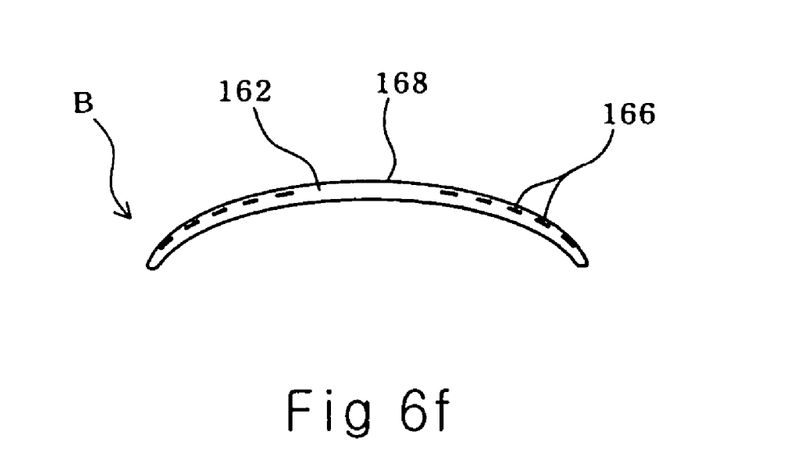

As shown in FIG. 6e, the lens material 150 is then supplied onto the lens body 160 on which the iris-colored part 166 is formed. The lens material 150 is polymerized on the surface of the lens body 160.

At this time, the lens material 150 and the predetermined color for the iris-colored part are made of substantially identical to those of the first embodiment.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A method for manufacturing a colored contact lens, the method comprising the steps of:
   molding a lower lens body with a curved bottom surface adapted for contact with an eye and an upper surface opposite said bottom surface, using a lower mold and an upper mold with a first lens material;
   cutting off a portion of said lower lens body extending from all of said upper surface of the lower lens body, forming a centrally located optical portion disposed within an annular cut portion, the optical portion extending above an upper surface of said annular cut portion, said annular cut portion extending from said optical portion to a peripheral edge of said upper surface of the lower lens body;
   forming an iris-colored part having an iris shape on the annular cut portion;
   molding an upper lens body on the lower lens body over said optical portion and said cut portion using the lower and upper mold with a second lens material; and
   cutting and off an upper surface of the upper lens body.

2. The method according to claim 1, wherein the lower and upper molds are made of a material selected from the group consisting of polycarbonate, polybutyleneterephthalate and a mixture thereof.

3. The method according to claim 1, further comprising the step of printing a transparent color on a surface of the optical portion.

4. The method according to claim 1, wherein the iris-colored part is formed by multiple printing in dot pattern.

5. The method according to claim 1, wherein the first and second lens materials are selected from the group consisting of HEMA(2-Hydroxyethylmethacrylate), HEMA+NVP(N-Vinyl-2-Pyrrolidone) and a mixture thereof.

6. The method according to claim 1 or 4, wherein the iris-colored part is formed with a mixture of colorant, $TiO_2$, and at least one of HEMA and HEMA+NVP.

7. A method for manufacturing a colored contact lens, the method comprising the steps of:
   forming a lens body by supplying a first lens material onto a lower mold and pressing the lens material with an upper mold, wherein said molds are made of a material selected from the group consisting of polycarbonate, polybutyleneterephthalate and a mixture thereof;
   forming an annular cut portion by cutting off an upper surface of the lens body, said annular cut portion extending from an optical portion to a peripheral edge of said upper surface of the lens body;
   forming an iris-colored part having an iris shape on the annular cut portion; and
   supplying and polymerizing a second lens material on a surface of the lens body.

8. A method according to claim 1, wherein said first and second lens materials are the same.

9. A method according to claim 7, wherein said first and second materials are the same.

* * * * *